Dec. 13, 1949 C. E. COOPER Re. 23,182

ADJUSTABLE LOUVRE SHUTTER OR BLIND

Original Filed Dec. 15, 1943 2 Sheets-Sheet 1

Inventor
C. E. Cooper
By Hancock Downing & Sebald
Attys

Dec. 13, 1949 C. E. COOPER Re. 23,182

ADJUSTABLE LOUVRE SHUTTER OR BLIND

Original Filed Dec. 15, 1943 2 Sheets-Sheet 2

Inventor
C. E. Cooper
By Glascock Downing & Seebold
Attys

Reissued Dec. 13, 1949

Re. 23,182

UNITED STATES PATENT OFFICE 23,182

ADJUSTABLE LOUVER SHUTTER OR BLIND

Clifford E. Cooper, Newtown, near Sydney, New South Wales, Australia

Original No. 2,457,871, dated January 4, 1949, Serial No. 514,412, December 15, 1943. Application for reissue June 30, 1949, Serial No. 102,381. In Australia December 22, 1942

5 Claims. (Cl. 20—62)

Matter enclosed in heavy brackets [ ] appears in the original patent but forms no part of this reissue specification; matter printed in italics indicates the additions made by reissue

This invention consists in a louvre shutter blind or the like which is mounted in an adjustable manner so that the angle of the louvre may be varied for the purpose of promoting ventilation and in some cases for providing blackout condition, if desired.

The present invention aims to provide a form of construction in which louvres or lathlike shutters are mounted in metal holders or end members pivoted in a longitudinal manner and capable of being rocked or turned upon their respective pivots by a system of levers and a single operating bar common to all of the louvres.

The present invention also relates to means carried by the metal holders or end members for the louvres, whereby access of wind and/or rain is prevented when the louvre or shutter is in the closed position.

Adjustable louvres are known, but the present form of construction differs therefrom in that it is of easy manufacture at a relatively small cost, is capable of mass production and is quickly assembled.

According to the present invention there are provided two stiles or metal fittings which are of channel or boxlike formation and consist of a face portion and two flange portions one of which is recessed, said channel fittings being of slightly greater length than the sum of the widths of the louvres when closed.

Each louvre which may be of glass or other material is mounted at each end in a slotted or channeled end member or metal holder adapted to be secured as by a riveting action to a pivoting member, the said member being formed with a bearing portion received in a hole in the respective metal fittings and having a flanged portion which engages the inner face of the said fitting. The pivoting members are freely mounted in one of the said fittings so as to turn easily in the holes therein.

Each of the pivoting members mounted in the other fitting have an arm extending therefrom, the said arm being either integral with the pivoting member or secured thereto.

The outer or free ends of the respective arms engage respective slots formed in a common operating member which is housed within the said fittings and is movable therein in a truly longitudinal manner by a suitable handle or lever or other means capable of imparting the said longitudinal movement in either direction of the said operating member.

The channeled end members or metal holders for the louvres are of a length substantially equal to the width of the louvre. The portion of each flange of the channel members on opposite sides thereof and at the ends thereof is cut away so that in the closed position of the louvres the latter lie closely face to face where they overlap one another, thus ensuring a watertight and weathertight closing of the shutter. The metal holders have a turned over portion to retain the louvre in the channels.

It has been found that wind and rain will pass between the metal fitting which is secured to the usual mullions, and the respective metal holders for the louvres and therefore it has been found necessary to provide bridging means for preventing this taking place.

In order to prevent ingress of wind and/or rain a bridging member is provided to bridge the space between the metal fitting and the channeled end members and is carried by the latter. The end members for the louvres each have a protecting strip disposed at right angles thereto and being formed either integral therewith or secured thereto in an approved manner. The bridging member is of channel section and adapted to receive the said protecting strip within it when the shutter is closed. In order that the bridging member may move in synchronism with the louvres the said member is pivotally connected to the lower end of each of the protecting strips of the metal louvre holders.

To provide the protecting strip for each louvre end member the said end member may be formed from a single sheet of metal bent or pressed to form a channel section with the protecting strip formed as a web at right angles to one side of the channel.

For instance commencing with the protecting strip portion there is a flange portion at right angles thereto formed of a double thickness of folded metal, then a base at right angles thereto, and finally another flange portion at right angles to the said base and parallel with the first double web portion. Viewed in section the louvre holder comprises for example, a vertical protecting strip, a vertical base for the channel and two horizontal flange portions for the channel between which the louvre is fitted, the said horizontal flange portion adjacent to the said protecting strip being doubled upon itself to form two thicknesses of the metal. If it is not desired to form the above double folded portion, the protecting strip may be formed from right angle section material welded or otherwise secured to the louvre holder.

In assembling the invention the respective pivoting members are placed in their respective holes in the metal fittings and each has a rectangular projection which is passed through a slot in the respective end members and is riveted over or welded to retain it in operative relation with respect to the stile. The glass or other louvres are then placed in the respective channeled end members.

In order that the invention may be more readily understood, reference will now be made to the accompanying drawings wherein.

Figure 1:
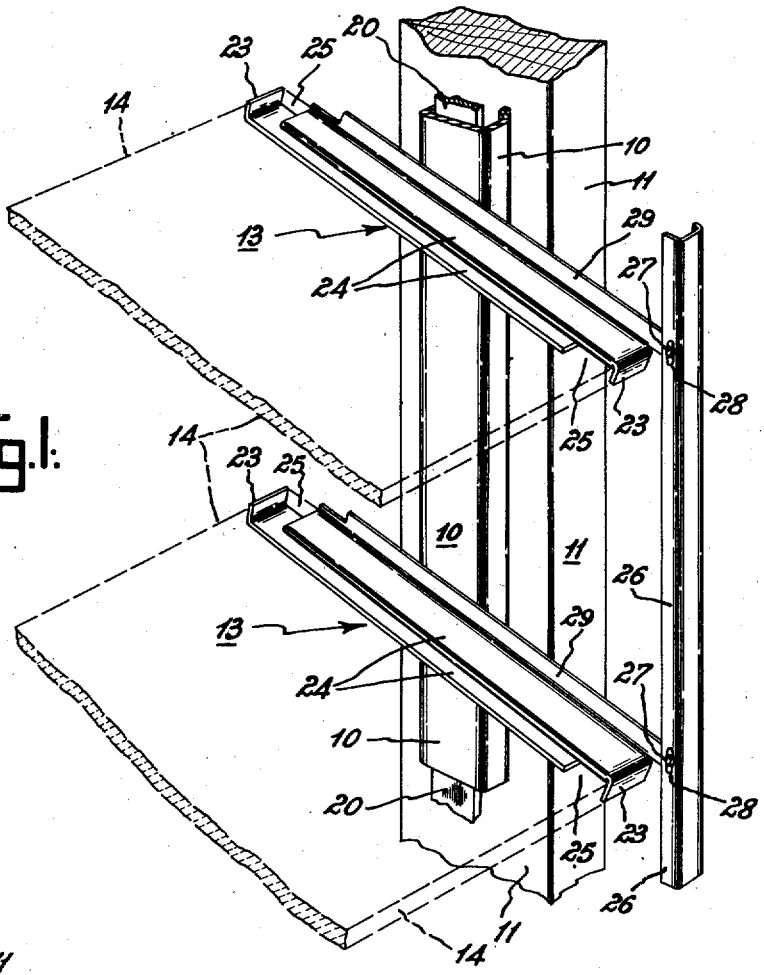
Figure 1 is a perspective view illustrating one end of a louvre blind or shutter made in accordance with the present invention and illustrating the attachment of a bridging member to the end channel members.

A pair of metal fittings 10 of channel formation and consisting of a face portion and two flange portions one of which is recessed, is provided for each set of louvre shutters, each of said fittings being secured to the usual mullions 11 and together form a housing within which pivoting and operating means for the louvres are received. At suitable distances apart holes are drilled in the metal fittings 10 to receive the bearing portion 12 of the pivoting members for the channelled end members 13 which support the louvres 14.

Figure 3:
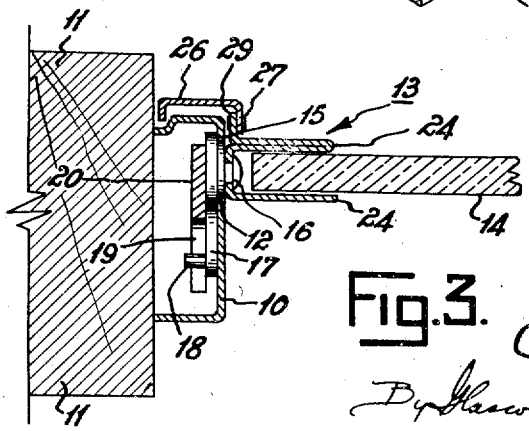
Figure 3 is a detail view in closed position illustrating in sectional plan the bridging member, its pivotal attachment to a channel end member, the pivoting means for the latter and the functional relation of the bridging member to the recessed flange of the metal fitting.

The pivoting members have a flanged portion 15, see Figure 3, which engages the inner face of the respective metal fittings 10, the said pivoting members also being secured to the channelled end members 13 by means of a turned over or riveted portion 16 which has been passed through a slot or hole formed in the end member for this purpose.

Figure 2:
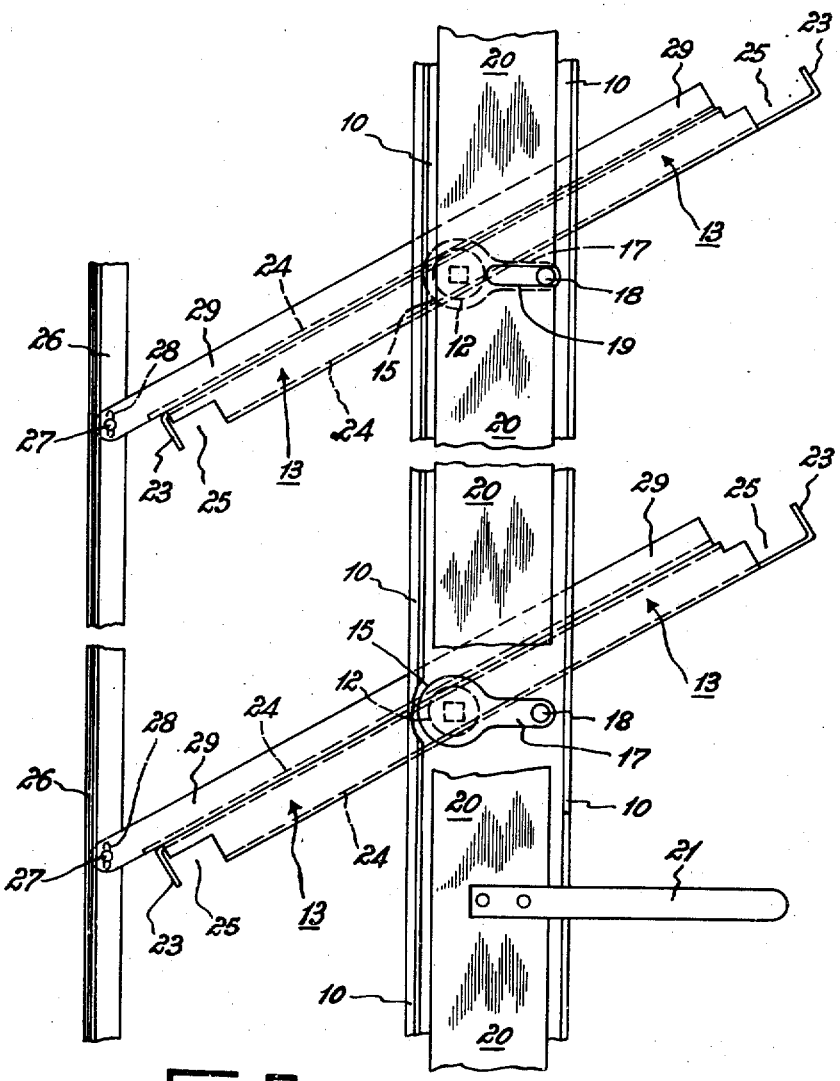
Figure 2 is an elevational view looking towards the inside of one of the metal fittings and showing the operating arms of the pivoting means for the respective louvres and the longitudinally movable member which moves in conjunction therewith.

Each of the pivoting members disposed in one of the said metal fittings 10 has an arm 17 extending therefrom the outer end of which has a pivot 18 adapted to engage a transverse slot 19 formed in a longitudinally movable operating member 20, see Figures 2 and 3. The said operating member 20 has an operating arm 21 or other suitable means for moving the said member 20 in a truly longitudinal manner within the said fitting.

The channelled end members 13 as illustrated are formed from one piece of metal pressed to the desired shape, for forming a protecting strip at right angles thereto.

The said end members 13 illustrated are channelled to receive the louvre 14 and are formed with lips 23. Portion of each flange 24 of the channelled end members 13 on opposite sides thereof is cut away at 25 so that in the closed position of the louvres 14 the latter lie closely face to face where they overlap one another thus ensuring a watertight and weathertight closing of the shutter when in the closed position seen in Figure 3.

A bridging member 26 of channel shape and having two flanges is provided to bridge the space between the metal fittings 10 and the channelled end members 13 in their closed position. This bridging member 26 is secured by a pin 27 and slot 28 form of connection to the protecting strip 29 of the said end member 13, the said strip being either integral with the end member 13 or attached thereto.

As illustrated the channelled end members 13 are formed from a single sheet of metal bent or pressed to form a channel section with the two flanges 24, and a protecting strip 26 attached thereto.

When in the closed position the bridging member 26 bridges the protecting strip 29 by means of its two flanges, one of which is pivotally connected to the respective protecting strips while the other flange enters the recess provided in the respective web of the metal fitting 10 provided to receive it.

I claim:

1. In a device of the character described, a channelled supporting fitting applied to the side of a window frame, louvre members, pivotally mounted in said fitting, operating means housed within the channelled fitting and operably connected to the louvre members, a protecting strip projecting angularly from each member and extending substantially throughout the width thereof, and a connecting and bridging member pivotally connected with the outer face of each protecting strip, said connecting and bridging member being angular in cross section whereby, when said louvre members are closed said connecting and bridging member jointly embraces the protecting strip and the adjacent portion of the supporting fitting to exclude draught and rain from the pivotal mountings and operating means for the louvre members.

2. In a louvre structure, in combination, opposed channelled fittings having their flange portions secured against the vertical sides of a window frame and having the flange portion on the outside recessed longitudinally and also having a series of openings in the medial portion, a series of louvres, channelled end members secured to the opposite ends of the louvres, journalling members extending from the medial portions of the channelled end members and journalled through the openings in the medial portions of the channelled fittings in such manner that the medial portions of the channelled end members are positioned adjacent the medial portions of the channelled fittings, operating means located within the channelled fittings and operatively associated with the journalling members and operable from a point on the flange portion on the inside of the fitting, angularly arranged protecting strips disposed lengthwise of the channelled end members with their respective ends short of one of the edges of the louvres and extending beyond the opposite edge, and channel shaped bridging members each having one flange portion operatively connected to the outer side faces of the projecting ends of the protecting strips so that when the louvres are closed the bridging members will be straddled about the aligning protecting strips and the adjacent portions of the channelled fittings while the other flange portions of the bridging members will be seated in the recessed flange portions of the channelled fittings.

3. In a louvre structure as claimed in claim 2 wherein the channelled end members and the angularly arranged protecting strips on each louvre are integrally formed from a single piece of strip metal.

*4. In a device of the character described, a channelled supporting fitting for application to the side of a window frame, louvre members pivotally mounted in said fitting, and operating means housed within the channelled fitting and operably connected to the louvre members, said operating means comprising a longitudinal member slotted transversely and movable longitudinally in said channelled fitting, pivoting members rotatable in holes in said channelled fitting, each pivoting member having a flange engaging the inner face of the channelled fitting and a projection on the pivoting member extending through and beyond the opposite outer face of the channelled fitting, crank arms extending from the respective pivoting members, pin and slot connecting means between said arms and said longitudinal member and said louvre members having shutter blade retaining channels*

*rigidly secured medially to the projection on respective pivoting members.*

*5. A device according to claim 4 wherein a pin extends laterally from each crank arm and engages in a transverse slot in said longitudinal member, thereby providing the pin and slot connecting means between said arms and said longitudinal member.*

CLIFFORD E. COOPER.

REFERENCES CITED

The following references are of record in the file of this patent:

UNITED STATES PATENTS

| Number | Name | Date |
|---|---|---|
| 1,551,753 | Lane | Sept. 1, 1925 |
| 1,891,485 | Tracy | Dec. 20, 1932 |
| 2,267,140 | Schottenberg | Dec. 23, 1941 |